(12) United States Patent
Panabaker

(10) Patent No.: US 7,921,258 B1
(45) Date of Patent: Apr. 5, 2011

(54) NONVOLATILE DISK CACHE FOR DATA SECURITY

(75) Inventor: Ruston J. D. Panabaker, Bellevue, WA (US)

(73) Assignee: Microsoft Corporation, Redmond, NV (US)

(*) Notice: Subject to any disclaimer, the term of this patent is extended or adjusted under 35 U.S.C. 154(b) by 384 days.

(21) Appl. No.: 11/638,944

(22) Filed: Dec. 14, 2006

(51) Int. Cl.
*G06F 12/16* (2006.01)
(52) U.S. Cl. .................................................... 711/126
(58) Field of Classification Search .................. None
See application file for complete search history.

(56) References Cited

U.S. PATENT DOCUMENTS

| | | | |
|---|---|---|---|
| 5,519,831 A | 5/1996 | Holzhammer | |
| 5,701,516 A | 12/1997 | Cheng et al. | |
| 5,745,905 A | 4/1998 | Larsson et al. | |
| 6,035,347 A | 3/2000 | Beardsley et al. | |
| 6,295,577 B1 | 9/2001 | Anderson et al. | |
| 6,397,229 B1 | 5/2002 | Menon et al. | |
| 6,941,423 B2 | 9/2005 | Coulson | |
| 6,947,956 B2 | 9/2005 | Olstad et al. | |
| 6,981,004 B2* | 12/2005 | Ganesh et al. | 707/202 |
| 7,051,223 B2 | 5/2006 | Batchelor et al. | |
| 7,136,977 B2 | 11/2006 | Obayashi et al. | |
| 7,240,241 B2* | 7/2007 | Oka | 714/19 |
| 2002/0026566 A1 | 2/2002 | Awada et al. | |
| 2002/0083281 A1* | 6/2002 | Carteau | 711/161 |
| 2005/0138311 A1 | 6/2005 | Ko | |
| 2005/0228962 A1 | 10/2005 | Takase et al. | |
| 2005/0246487 A1 | 11/2005 | Ergan et al. | |
| 2005/0289533 A1* | 12/2005 | Wang et al. | 717/168 |
| 2006/0069870 A1 | 3/2006 | Nicholson et al. | |
| 2006/0155931 A1* | 7/2006 | Birrell et al. | 711/115 |
| 2006/0161748 A1 | 7/2006 | Wang et al. | |
| 2007/0033356 A1* | 2/2007 | Erlikhman | 711/162 |
| 2007/0185879 A1* | 8/2007 | Roublev et al. | 707/10 |

OTHER PUBLICATIONS

International Search Report and Written Opinion for PCT Application No. PCT/US2007/085910, mailed on Apr. 4, 2008, 14 pages.
Baker, Mary et al., "Non-Volatile Memory for Fast, Reliable File Systems", ACM, 1992, pp. 10-22.
Pnevmatikatos, Dionisios et al., "On using network RAM as a nonvolatile buffer", Cluster Computing, vol. 2, Issue 4, 1999, ISSN:1386-7857, pp. 295-303.
Brown, Alfred Leonard, "Persistent Object Stores", Department of Computational Science University of St. Andrews, Oct. 1988, 120 pages.
Seltzer, Margo I. et al., "Journaling Versus Soft Updates: Asynchronous Meta-data Protection in File Systems", 2000 USENIX Annual Technical Conference, Feb. 7, 2002, pp. 71-84.

* cited by examiner

*Primary Examiner* — Duc T Doan

(57) ABSTRACT

Described is a technology by which a secondary nonvolatile storage (e.g., a flash memory device) maintains a copy of the changes made to a hard drive after a data backup operation. The backup changes are combinable with backed up data to recreate a hard drive state, whereby changes after the last backup are not lost, e.g., if the hard drive fails. The backup change data may maintain the changes at the block (e.g., allocation unit) level corresponding to hard drive blocks, or at the file level, corresponding to files or parts of files on the hard drive. The backup changes may be filtered, so that only certain data (e.g., user data) are maintained as backup change data. Read requests can be satisfied by reading data from the backup change data, or from a performance (e.g., disk) cache that may also reside on the nonvolatile storage.

19 Claims, 9 Drawing Sheets

NONVOLATILE DISK CACHE FOR DATA SECURITY

BACKGROUND

Hard disk drives can fail, which is the reason that many users back up their data, or at least should back up their data, on a regular basis. However, when a hard disk drive fails, any data that was written to the hard disk drive since the time of the last backup is likely to be lost, given contemporary computing models having a single hard disk drive in the system.

Solutions such as RAID (redundant array of independent disks, which may include disk mirroring concepts) help protect against such loss of data. However, such solutions are expensive, can be inefficient and can degrade performance, and are thus not desirable to many computer users.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a first nonvolatile storage (e.g., a computer hard drive) maintains a current state of data, including changes made after a first data state that includes data saved as part of a data backup operation. A second nonvolatile storage, (e.g., a flash memory device) maintains backup changes made after the first state. The backup changes are combinable with the data in the first state to recreate a restore state corresponding to the current state. Thus, data can be restored by reading the backup change data in the second nonvolatile storage and reading the maintained backup data, whereby changes made after the backup data was saved are not lost, e.g., if the hard drive fails.

In one example implementation, a computing device has a primary nonvolatile storage that maintains a current state of data, and a secondary nonvolatile storage that maintains changes to the data from a starting point that corresponds to a previously preserved data state. A restore mechanism may recreate a restored state corresponding to the current state by combining data of the preserved data state with changes to the data maintained in the secondary nonvolatile storage. The primary nonvolatile storage may be a first hard disk drive, and the secondary nonvolatile storage may be flash memory, battery-backed up RAM, another hard disk drive, static RAM, an EEPROM device, or a network storage location, or any combination thereof. The secondary nonvolatile storage may be coupled to the computing device via a universal serial bus device interface, as a card, as a motherboard component, by a wired connection, or by a wireless connection, or by any combination thereof.

In one example implementation, the backup change data may be maintained along with metadata that associates the data with at least one block (e.g., allocation unit) on the storage device. Alternatively, or in addition to, the backup change data may be maintained along with metadata that associates the data to at least part of a file on the storage device. The backup changes may be filtered, so that only certain writes are maintained as backup change data.

Further, in one example implementation, read requests can be satisfied, at least in part, by reading data from the second nonvolatile storage. A performance cache (e.g., a disk cache) may also reside on the nonvolatile storage. The backup change data space may grow into the performance cache space if needed.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards the use of nonvolatile memory to provide a relatively inexpensive and robust data security solution that preserves data that has changed between hard disk drive backups. In the event of a hard drive failure (or stolen hard drive such as with a laptop computer), the backed-up data changes may be combined with the last hard drive data backup to restore the data to its current state. As will be understood, the present technology also has the added benefit of allowing for performance enhancement.

In one example implementation, the changed data is contemporaneously backed up by writing that data to a nonvolatile memory, such as a flash device. However, as will be understood, any type of nonvolatile memory will suffice as a change backup medium, including battery-backed up RAM, another hard disk drive, static RAM, EEPROM devices, a network storage location and so forth. Moreover, multiple backup media including media of different types may be combined in the same computer system.

Further, although examples of units of changed data that can be backed up as described herein include files, portions of files, or disk allocation units (e.g., sectors or clusters, referred to herein as blocks), there is no requirement that any particular unit be used, and indeed, types of units may be mixed on the same backup media, such as to back up an entire file as one unit, some blocks as other units, and so forth. Moreover, not every change written to disk need be backed up; for example, a user can set a filter such that only changes written to a certain directory set are contemporaneously backed up to nonvolatile memory, while other changes are not.

As such, the present invention is not limited to any particular embodiments, aspects, concepts, structures, functionalities and/or examples described herein. Rather, any of the embodiments, aspects, concepts, structures, functionalities and/or examples described herein are non-limiting, and the present invention may be used various ways that provide benefits and advantages in computing and data security in general.

Figure 1:
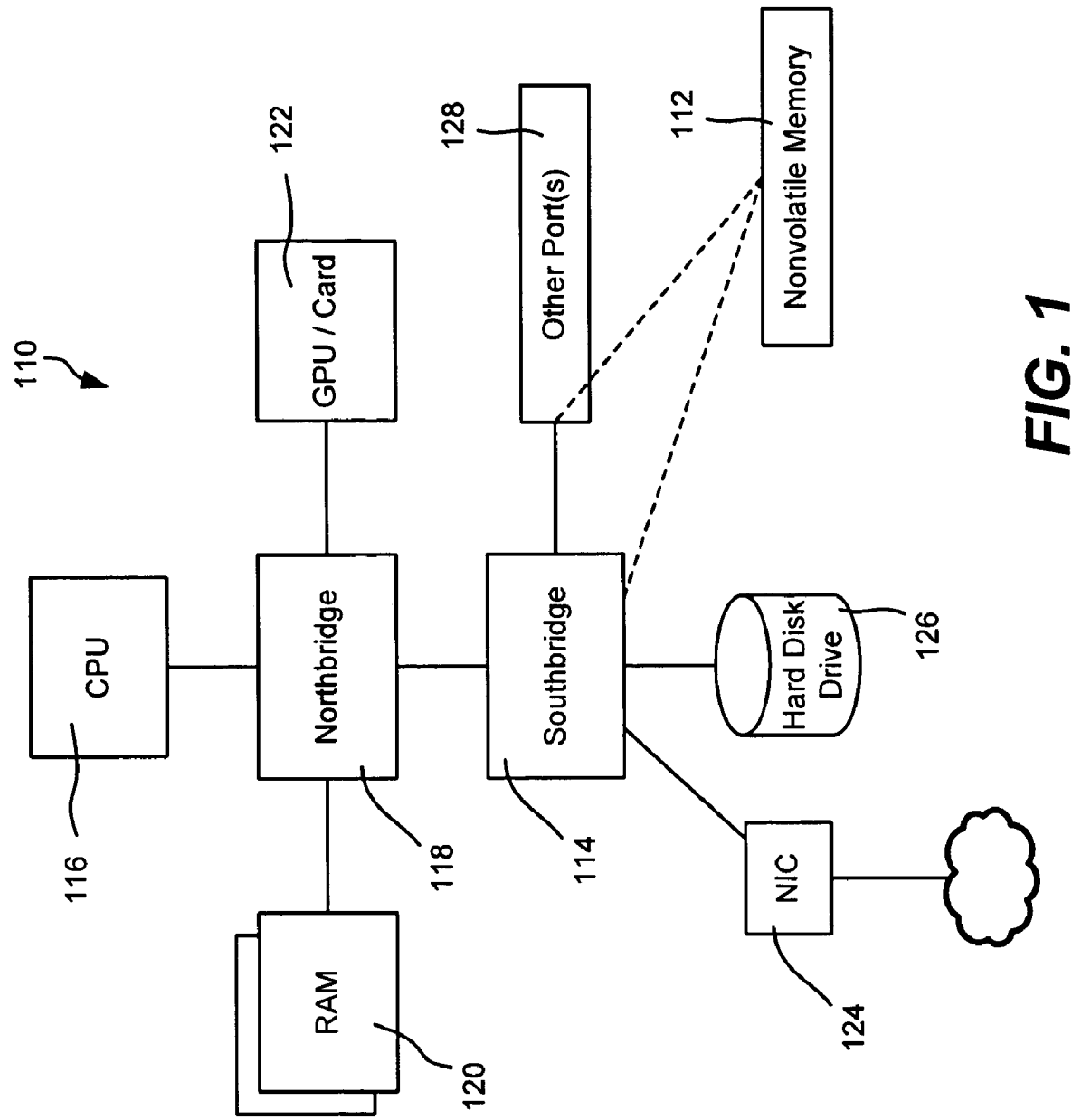
FIG. 1 shows an illustrative example of a general-purpose computing environment into which various aspects of the present invention may be incorporated.

FIG. 1 shows an example block diagram in which a general purpose computer system 110 includes a nonvolatile memory 112 coupled to a Southbridge chip 114, which in turn is coupled to other conventional computer system components. As is typical, the example computer system 110 of FIG. 1 includes a processing unit (CPU) 116, which is coupled via a Northbridge chip 118 to RAM 120 and a graphics processing unit (GPU/Card) 122. As is also typical, the Southbridge chip 114 is shown as connecting to a network interface card (NIC) 124 for remote connectivity, to a hard disk drive 126, and to other ports 128 for device connectivity.

Figure 2:
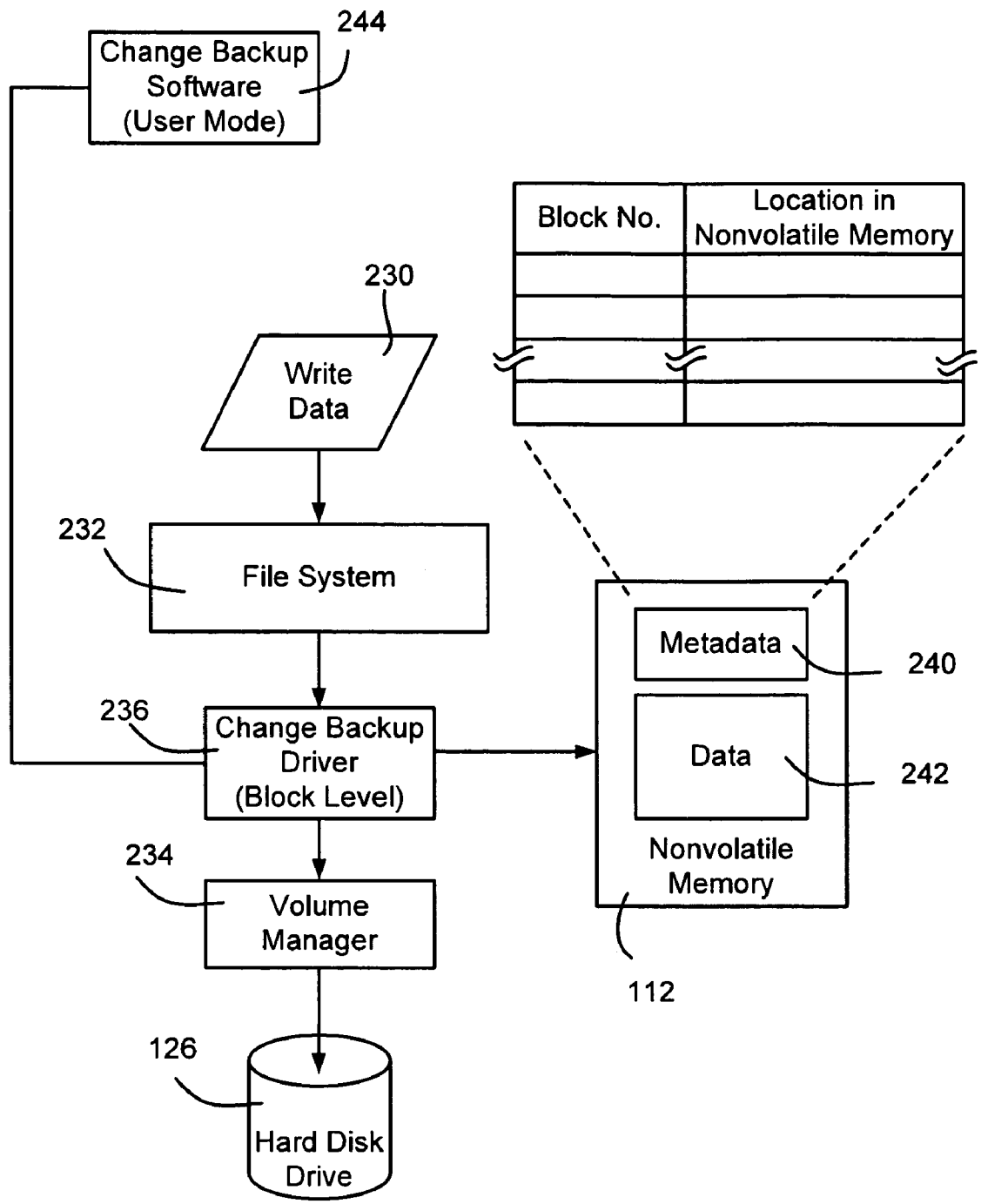
FIG. 2 is an example representation of a write request being handled by conventional hard disk storage means and secure backup to nonvolatile memory at a block (allocation unit) level.

Note that as indicated by the dashed lines in FIG. 2, the nonvolatile memory 112 can alternatively connect through such a port 128, such as a universal serial bus (USB) memory device interface. The nonvolatile memory 112 can connect as a card (e.g., Peripheral Component Interconnect, or PCI, PCI express, PCMCIA), may be built into the computer system motherboard, or may be coupled in essentially any other way, including via a network connection, FireWire, Bluetooth®, infrared, serial port, parallel port and so forth. Further, as mentioned above, there may be multiple nonvolatile memory types in a single computer system.

Note that FIG. 1 is only one example architecture; other alternatives may include having a nonvolatile memory linked to the Northbridge (NB), such as a portion of battery-backed up RAM.

As described above, changes corresponding to hard disk writes since some previously preserved state (e.g., a prior hard disk backup) are stored in the nonvolatile memory 112. As represented in FIG. 2, in one example alternative implementation, change backups can take place at the allocation unit, or block level. More particularly, when a write request is pending, the write request data 230 is sent through a number of drivers before actually being written to the hard disk drive 126. This request may be in the form of an I/O request packet, or IRP that passes through a driver stack, or may be controlled by a driver manager architecture which, in a managed order, selectively routes IRPs or other data structures to each driver and handles returned data. In any event, data 230 to be written to a hard drive 126 may be processed by one or more drivers prior to its being written.

In the example of FIG. 2, as is known, a file system 232 maps write requests corresponding to data at specified file locations to various blocks (e.g., clusters or sectors) corresponding to the hard drive formatting, and writes the file data to those blocks via a volume manager 234. The file system 232 tracks the mapping (e.g., in a file allocation table or master file table) so that the appropriate data is located for read requests for data at specified file locations.

To securely backup block-level writes corresponding to changes since a last state, (e.g., a utility-based hard drive backup), a change backup driver 236 operating at the block level copies the write data 230 to the nonvolatile memory 112.

Each write to the nonvolatile memory 112 is tracked via metadata 240, whereby the data 242 written to the metadata may be properly read back. Although various techniques may be used to track such writes, such as a header accompanying each set of data written, FIG. 2 exemplifies a mechanism in which the metadata 240 records the block number on the hard drive in conjunction with its corresponding location in the nonvolatile memory 112.

As can be readily appreciated, one advantage of block level change backup is that it basically allows a hard disk drive to be exactly recreated on another hard disk drive by applying changes to data saved at the time of the last full backup. Notwithstanding, it is also possible to functionally (rather than exactly) recreate a hard drive, such as by selectively copying some changed data, but not other data such as logs, certain metadata and the like that change frequently but are not relevant to the programs and user data stored on the hard drive. To reduce the amount of data copied, block level filtering may be performed, such as to not backup blocks that are known to be unnecessary to functionally recreate a hard disk. User mode change backup software 244 is shown in FIG. 2, such as software that provides an interface to a user to configure settings, e.g., exclude certain types of data from which corresponding blocks may be located for block level filtering. The software 244 may further allow a user to specify block level backup (versus file level change backup and thresholds, described below) as well as control any other change backup variables (e.g., to add or adjust nonvolatile space).

A disadvantage of block level change backup is that users may cache a lot of changes that are not needed for their particular purposes, even if relatively sophisticated block level filtering was employed. For example, a user may want the data from work files backed up, but not data changes corresponding to recorded television shows, game files and so forth. As such, an alternative data change backup mechanism performs file level change backup, in which only the changes to selected files (e.g., as identified by their extensions) and/or directories are backed up.

Figure 3:
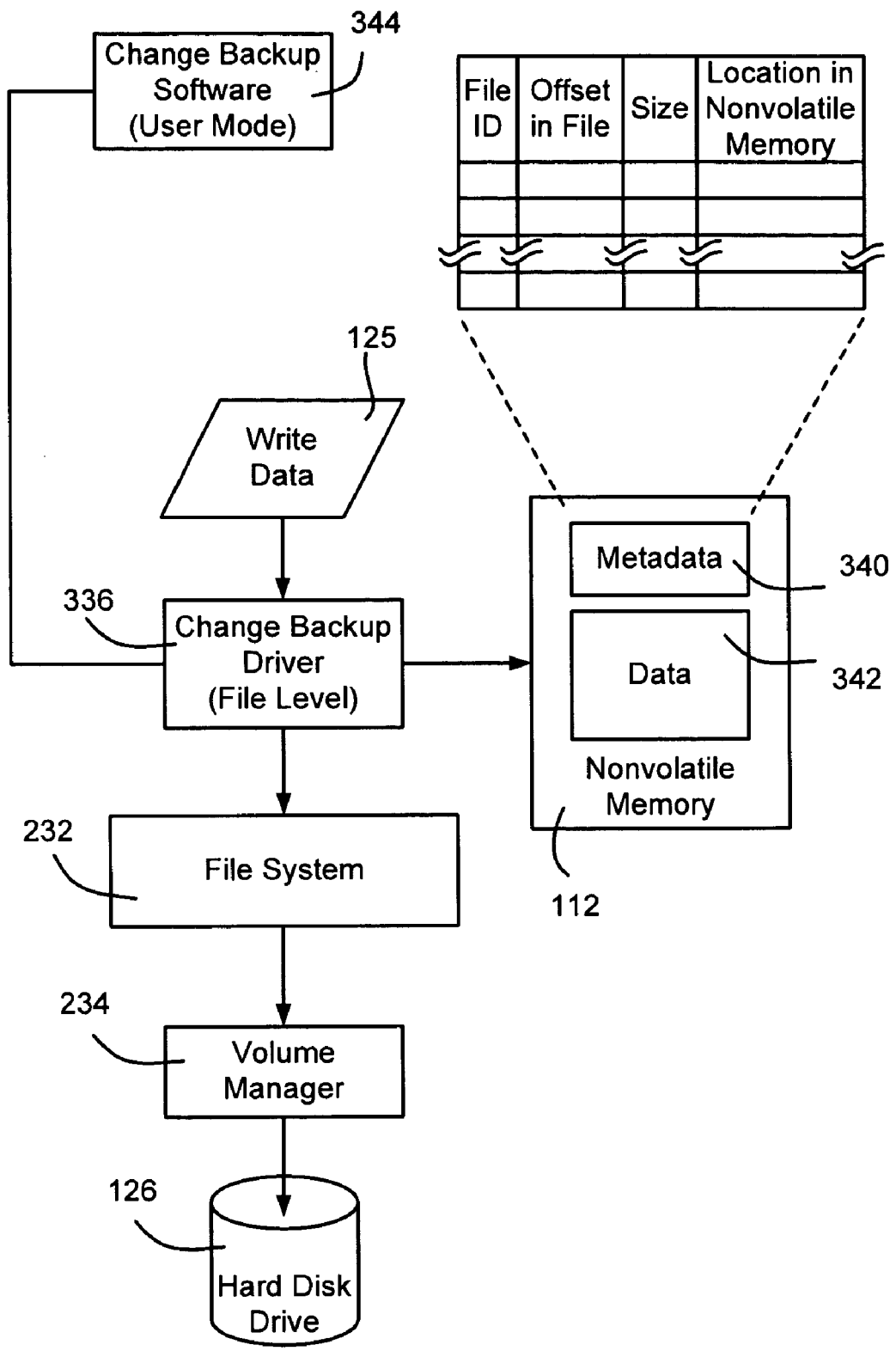
FIG. 3 is an example representation of a write request being handled by conventional hard disk storage means and secure backup to nonvolatile memory at a file level.

FIG. 3 exemplifies file level change backup concepts, in which the data to write 125 is copied by a file level change backup driver 336 before it reaches the file system 232. As is known, the data write is accompanied by metadata including a file identifier, an offset into the file, and the write size. As can be readily appreciated, this file metadata can be the basis for metadata 340 used to track the data 342 copied to a location or set of locations in the nonvolatile memory 112. In addition, user mode change backup software 344 is shown in FIG. 3, such as software that provides an interface to a user to select files, file types and/or directories for file level inclusion or exclusion filtering; the software 344 may further allow a user to specify block level versus file level change backup, set thresholds (described below), control other variables, and so forth.

The nonvolatile memory 112 need not be used exclusively for change backups, but in part can be used for conventional purposes such as to act as a disk drive, as well as for new purposes. Space can be allocated for each purpose, e.g., a four gigabyte flash device can have one gigabyte for a disk drive and three gigabytes for backup change storage. Reallocation is possible, however once space is used in a disk drive or in backup change storage, that space cannot be reallocated for another purpose until that space is freed, otherwise its corresponding file data or backup change data would be lost.

One new technology for using nonvolatile memory is to increase computer system performance by having nonvolatile memory act as a disk cache. To this end, blocks (e.g., sectors) are copied to the nonvolatile memory on write requests, and when available, are read back from the nonvolatile memory on read requests. As is understood, this is far faster than conventional disk access, providing significant performance improvements.

With respect to combining a performance cache and backup change data on the same device (or set of devices), dynamic reallocation is possible by freeing space in the performance cache as needed for storing backup change data. Performance cache data can be discarded like any other cached data when space is needed and it has been flushed to disk. Note that once backed-up, change data can also be used for performance gains, since change data is also available for read access on the nonvolatile memory 112. However, backed-up change data may be only a subset of a user's total data writes, e.g., when filtered from among many writes, and thus maintaining a performance cache is still of significant value when nonvolatile memory space is not otherwise needed for change data backup.

Figure 4A:
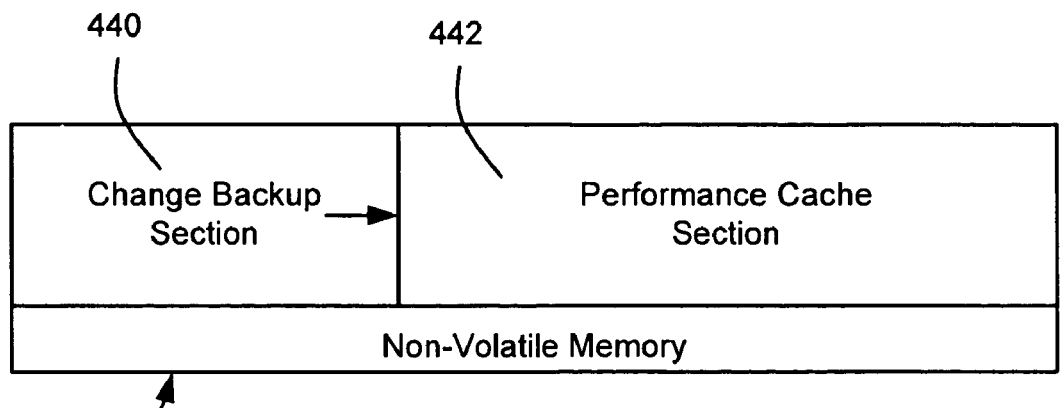
FIGS. 4A-4C are example representations of how nonvolatile memory may be allocated between a backup security section and a performance section as writes and other events occur over time.
Figure 4B:
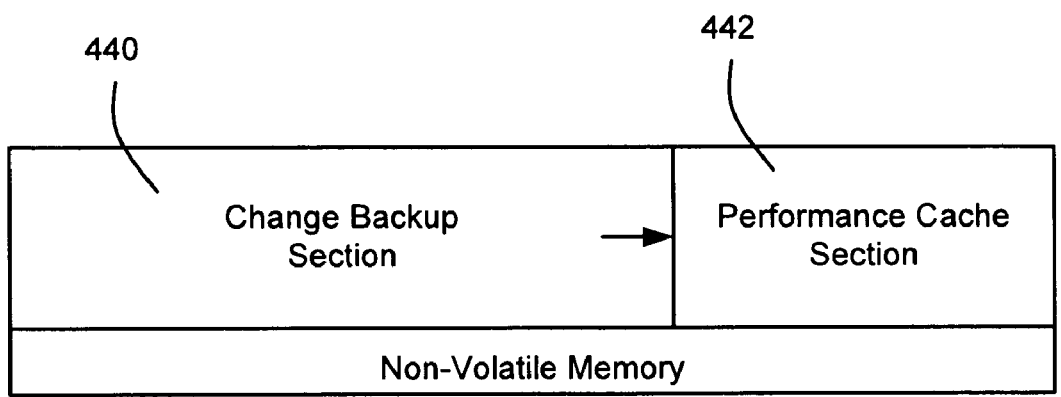
Figure 4C:
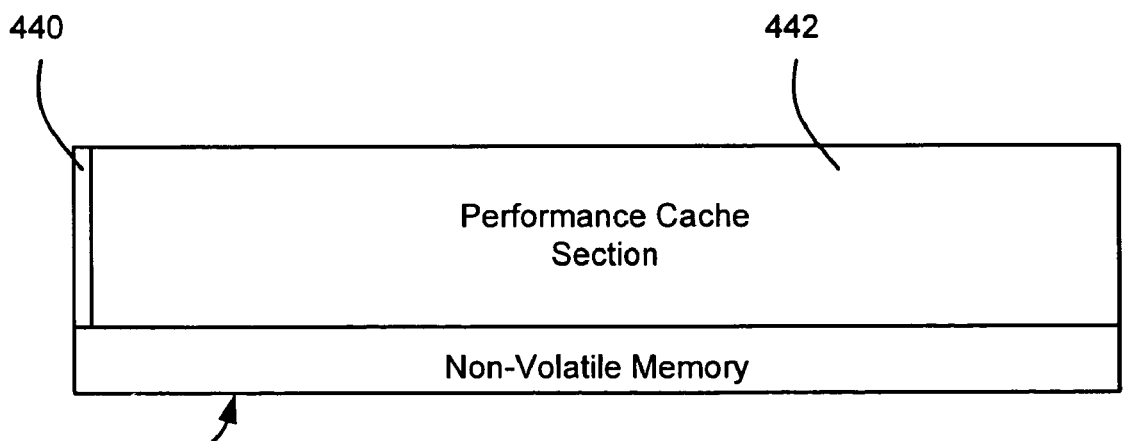

FIGS. 4A-4C show the concept of growing a change backup data section 440 into space available for use or previously used by a performance cache section 442 of nonvolatile memory 112. As seen in the variance in the sections' sizes from FIGS. 4A to 4B, as more backup space is needed for change writes, the change backup section 440 grows as the performance cache section 442 shrinks, generally until no room remains in the nonvolatile memory 112, (as described below). As represented in FIG. 4C, the performance cache section 442 may be returned to a larger section, (e.g., all or almost all if some small space is always reserved for the change backup section 440) of the nonvolatile memory 112 space when the change backup section 440 is no longer needed for storing changed data. Some minimum amount of space may be defined for the change backup section 440. This reallocation may be following the next utility-based backup operation of the hard disk, or after the change backup section 440 is transferred to another media, as described below.

As can be readily appreciated, block-level performance caching and block-level change backup can be incorporated into the same module, e.g., the same driver. Indeed, if block-level change backup performs no filtering operations, no real difference exists in handling writes. However, unlike performance caching, to protect against data loss if the hard drive fails, change backup software needs to notify the user when the cache is full, in which event the user needs to take action to preserve future changes, e.g., perform a utility-based hard drive backup, transfer the nonvolatile memory contents to another storage, add more storage, compress the data, or the like.

Figure 5:
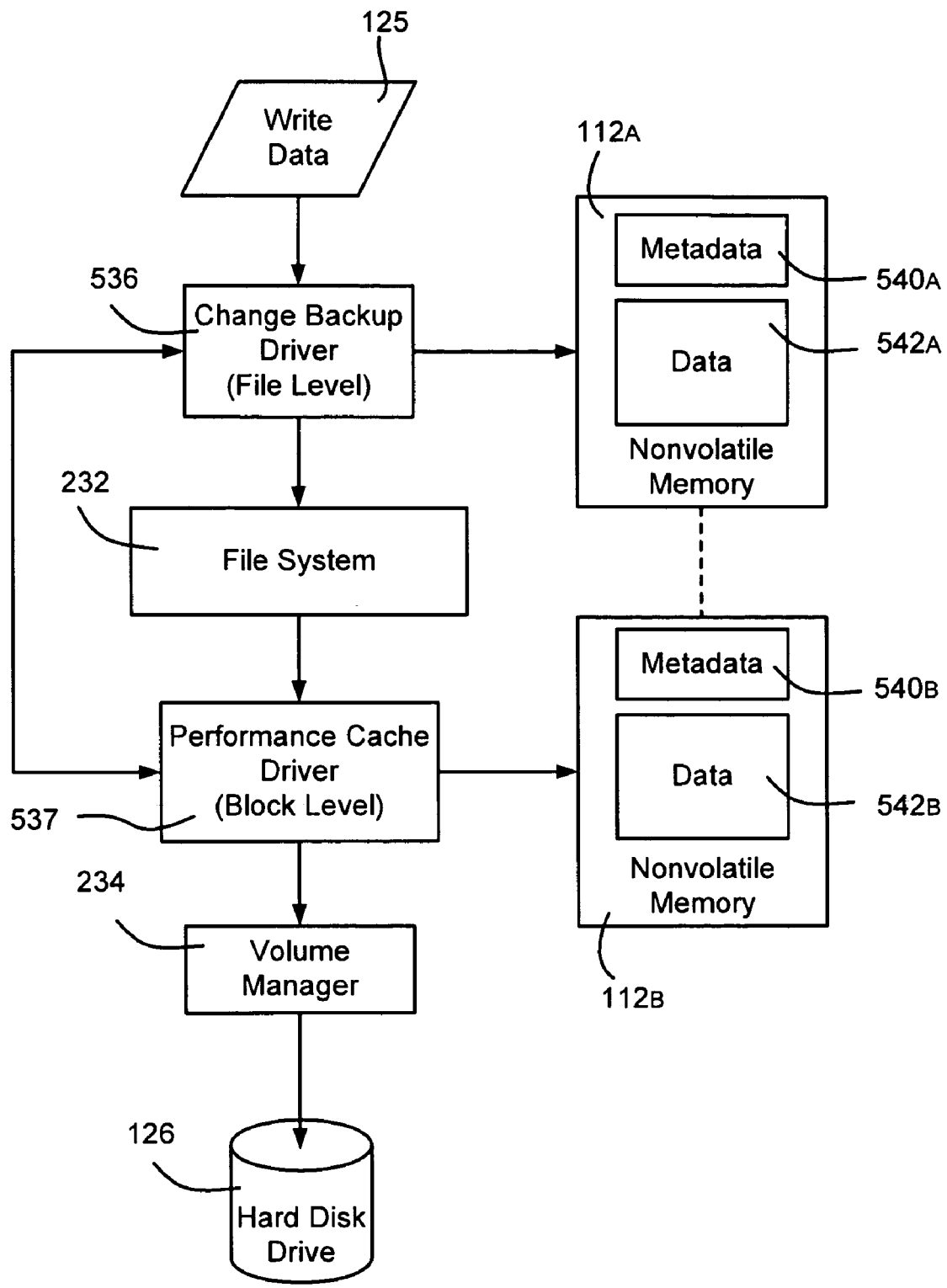
FIG. 5 is an example representation of a file level change backup driver and performance cache driver.

FIG. 5 shows the concept of a file level change backup driver 536 coexisting with a performance cache driver 537 (which also may comprise a block-level change backup driver). In FIG. 5, the change backup driver 536 operates via filtering to efficiently back up only those changes corresponding to a specified set of files, specified directory set, and so forth. As such, not all changes are backed up, and the change backup section 440 (FIG. 4A, corresponding to the metadata 540A and data 542B regions in FIG. 5 of the nonvolatile memory 112A) does not grow as fast as it would with block level change data backup.

In this example, performance level caching takes place at the block level via a performance cache driver 537. This may be to its own regions 540A and 540B of its nonvolatile memory 112B, which can shrink. Note that in one alternative, any backed up change data at the file level is also written (as the data in its corresponding blocks) to the performance cache. For efficiency, the change backup driver 536 can communicate with the performance cache driver 537 to avoid writing the same data twice to the nonvolatile memory 112.

Various other aspects of change backup to a nonvolatile storage may be used to improve the overall user experience. For example, data encryption and decryption may occur at higher driver levels, transparent to the backup driver. For security, the decryption key may be kept with the mass backup data rather than with the nonvolatile storage, because if the nonvolatile storage is removable and becomes lost or stolen, any data thereon is encrypted without the key accompanying that encrypted data.

A user may also determine a level of data security. For example, a user may employ mirroring or similar RAID techniques to spread out changes data over multiple (inexpensive) nonvolatile storage devices. Multiple nonvolatile storage devices may also be used for performance reasons, e.g., to provide parallel data access.

Thresholds may be set, such as the amount of space that can be consumed by backup changes before the software managing the device suggests performing a hard drive backup or transferring the backup changes to another media. More careful users, or those who tend to perform large-sized changes, can set the threshold warning level to provide sufficient advance warning.

Changes may be backed up per-user. For example, a user may have nonvolatile storage back up only that user's changes, rather than another user's changes, regardless of the changed file's ownership. A filter that recognizes (e.g., as part of the metadata) the current user's changes may be employed, whereby a user can recreate the hard disk state with only that user's changes since the last backup. Alternatively, the metadata in the nonvolatile storage can be used to maintain which user made a change for later differentiation among the changes. This allows a user to restore his or her own changes in the event someone else makes changes to (e.g., corrupts) a shared filed.

Figure 6:
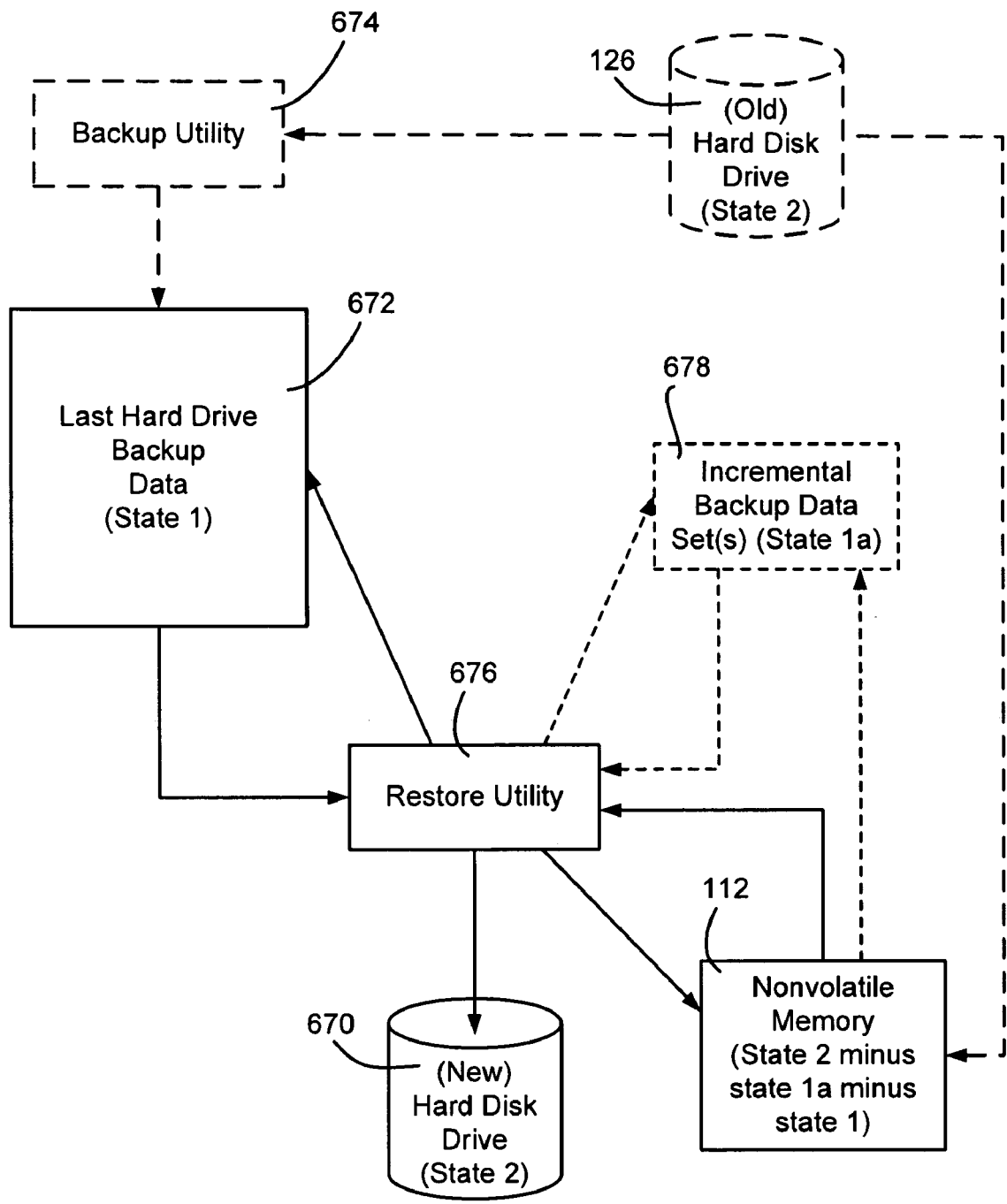
FIG. 6 is block diagram representing an example restore operation using secure backup data from a nonvolatile and last backup data to recreate a hard disk state since the last full backup.

Turning to a consideration of restoring data from the nonvolatile storage, FIG. 6 shows an example of restoring to a new hard drive 670. Notwithstanding, it is understood that the restoration may be to the same hard drive (re-formatted or to a free space thereon) if hard drive failure was not the issue, such as if a user's data or shared data was corrupted by another user, as described above.

To restore, the last hard drive backup data 672 (e.g., previously backed up at hard drive state 1 by some backup utility 674 or the like that may no longer exist in the event of the failure of the previous hard drive 126) is written to the new hard drive 670 by a restore utility 676, with changes from the nonvolatile memory 112 applied to update the new hard disk drive 670 to re-create its last state, state 2. As described above, this basically may be an exact re-creation, a functional re-creation, or a specified data re-creation.

Also represented in FIG. 6 is the concept of one or more incremental backup data sets 678 that may exist. More particularly, a user may transfer the contents of the nonvolatile memory 112 to an incremental backup data set containing the backed-up changes, e.g., when the nonvolatile memory is becoming full of backup changes. This data set or group of data sets 678, corresponding to a backup state 1a, may be stored anywhere, but for security purposes would not be stored on the hard drive due to the possibility of failure or loss, (although for recovering from data corruption purposes it may be stored on the hard drive). For example, network flushing may be selected to automatically transfer the nonvolatile memory 112 to network storage, which may keep the last hard drive backup data 672 in association with the incremental backup data set or sets 678. Optical media flushing is another alternative, as can be inserting a different flash device, knowing that the new flash device is incremental relative to the previous the incremental backup data 678, not directly relative to the last hard drive backup data 672.

Any number of incremental backup data sets 678 may be maintained, as long as the order is preserved. Upon restore, the backed up hard drive data (state 1), along with the changes in any incremental backup data sets 678, correspond to the state (referred to herein together as state 1*a* with the order preserved) prior to the start of writing the changes on the nonvolatile memory 112. Note that one way to restore is to write the hard drive contents, and then overwrite the data as changes occurred, in order, through any incremental backup data sets and then ending with the changes in the non-volatile memory 112. An alternative way to restore is to fill in each block once, starting with the most recent change that can be found for that block, going back in time as necessary to find the last change (all the way to the state 1 hard drive backup data 672 if no more recent change exists). Note that in this latter restoration alternative, the changes in the non-volatile memory 112 are restored first.

Yet another aspect refers to caching the changes on the hard drive itself when the nonvolatile storage device is not available, e.g., was detached by the user or is full. Then, upon later availability, (e.g., reattachment or transfer to another medium), those cached changes can be synchronized back to the nonvolatile memory. This carries the risk of hard drive failure or loss before full synchronization, but still provides benefits.

By way of example, at the block level the change backup driver or similar component can simply log which blocks are changed (dirtied) with respect to needing to be synchronized. Similarly, at the file level, the change backup driver can track the metadata of relevant writes. When nonvolatile memory again becomes available, synchronization can be automatic. By using transaction concepts to separately synchronize each block or subset of blocks, or a portion or portions of a file, partial synchronization is possible when full synchronization cannot be completed in a single session.

The user may be notified in various ways as to the state of the change backup data, including via text, graphics and so forth. For example, a green indicator on a computer-displayed icon or elsewhere (e.g., an LED on the nonvolatile memory device) may indicate that all relevant changes have been backed up and the data is safe. A yellow indicator may indicate that all relevant changes have been backed up, but that the nonvolatile storage device is running low on space, and a hard drive backup or incremental transfer should be performed. A red indicator may indicate that all changes have not been backed up, e.g., due to space limitations, the device having been removed and so forth, although as described above these changes may be maintained on the hard drive for synchronization.

Figure 7:
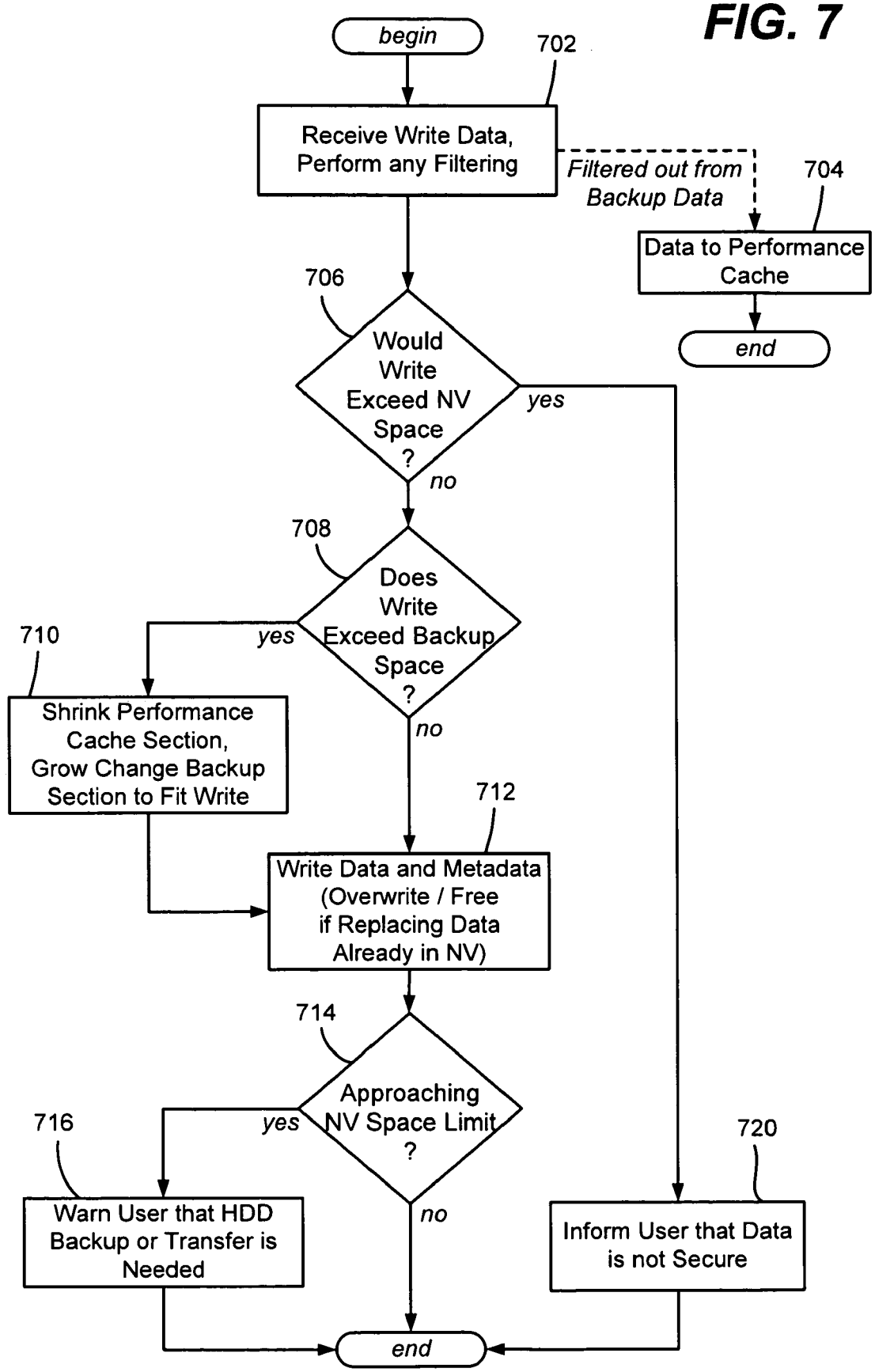
FIG. 7 is a flow diagram showing example steps that may be taken to back up write data to a nonvolatile memory.

Turning to an example explanation for handling write data, FIG. 7 is a flow diagram showing possible steps that may be taken to process write data, e.g., at a change backup driver. Step 702 represents receiving the write data, with step 704 representing performance caching any of the write data that is excluded from change backup storage as a result of filtering.

If at least some write data is to be backed up as a change, step 706 compares its size to the amount of free space on the nonvolatile memory. This free space includes any performance cache space, which can be shrunk via steps 708 and 710. Further, step 706 includes if the nonvolatile storage has been removed, in which case the free space is zero. If insufficient space, the change cannot be backed up, and the user is notified that the data is not secure via step 720. Although not specifically shown, it is understood that as described above, the data changes not backed up may be logged or otherwise preserved on the hard drive so that synchronization can later occur when space is available/the nonvolatile memory device is reattached.

If sufficient space is available in the nonvolatile memory because of the performance cache space, but is insufficient in the backup section, steps 708 and 710 grow the backup section space by shrinking the performance cache space. Step 712 then writes the appropriate data and metadata to the backup section. Note that data can overwrite corresponding data that already exists (e.g., in the same block or file section), either by directly overwriting or by writing to new space and freeing the old space. Further, note that write errors and the like can be handled in a known manner.

Step 714 evaluates whether following the write, the amount of free space is approaching a threshold limit, which may be user configurable. If so, the user is warned that the backup space is running low, that is, that a hard drive backup or transfer to an incremental data set is needed soon to avoid the possibility of data loss.

Figure 8:
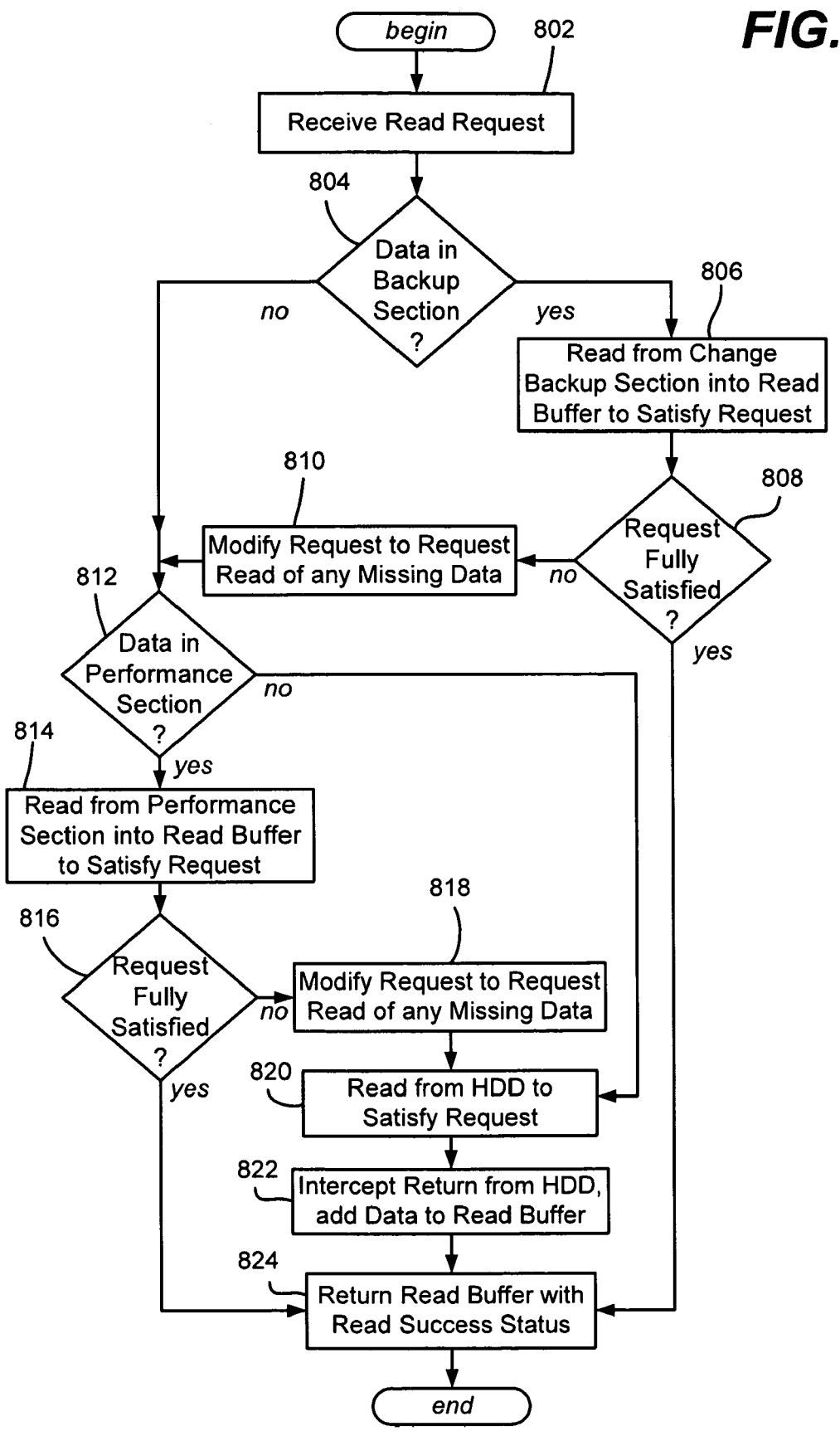
FIG. 8 is a flow diagram showing example steps that may be taken to read data from a nonvolatile memory and hard drive for increased performance.

FIG. 8 represents example steps that may be taken to handle a read request in an efficient manner by reading from the nonvolatile memory when possible, beginning at step 802 where the read request is received. Step 804 evaluates whether the requested data is in the backup section. Note that this tends to be frequently used data, and thus is often present. Alternatively, the performance section can first be evaluated as to whether requested data is present therein.

At step 804, if at least some of the data is present in the change backup section, step 806 is performed to read that data into a read buffer, otherwise step 812 is performed to look for the requested data in the performance cache. If read at step 806 and the request is fully satisfied as represented by step 808, then that read buffer, with appropriate success status, is returned at step 824.

If none or only part of the data was available from the change backup section, step 810 modifies the original request into one or more read requests that seek the missing data. At step 812, if at least some of the data is present in the performance section, step 812 branches to step 814 to perform the read (or reads), otherwise step 812 branches to step 820 to perform the read (or reads) from the hard disk drive.

If step 814 is executed, step 816 represents whether the original read request is fully satisfied. If so, then the read buffer, with appropriate success status is returned at step 824. If not fully satisfied, then step 818 adjusts the read or reads to access the hard disk drive for the missing data, and step 820 reads from the hard drive; step 822 and 824 are executed so that the read request appears to the requesting entity to be a normal read operation.

It should be noted that the steps of FIG. 8 are only one way to satisfy a read request, e.g., by building up a read buffer to the extent possible with data from the nonvolatile storage, so that the hard disk drive is only accessed as necessary to obtain as little data as needed to complete the request. However, other alternatives, such as to determine whether the read can be entirely satisfied via the nonvolatile storage, and if not, perform the entire read from the hard drive as usual, may be implemented.

Figure 9:
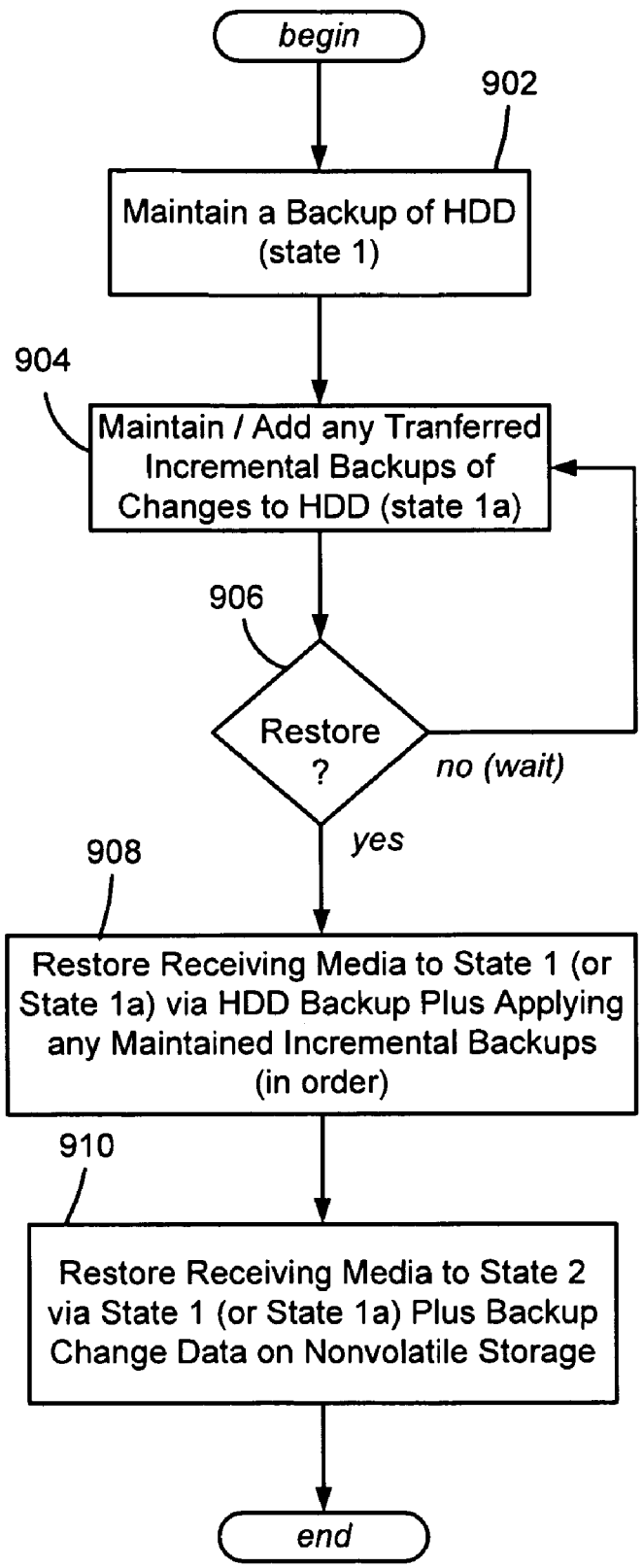
FIG. 9 is a flow diagram showing example steps that may be taken to restore data from backed up data and backup change data of the nonvolatile memory.

FIG. 9 represents the restore operation, with steps 902 and 904 representing backing up the hard drive (e.g., to a full backup via a backup utility), and step 904 representing maintaining any incremental backups, that is, transferred from the nonvolatile storage since the last regular backup operation.

Step 906 represents waiting for the restore operation, which may occur far in the future. Thus, step 906 is not typically a recurring loop within a process, but rather represents waiting to begin an entirely separate restore operation process.

Steps 908 and 910 represent re-creating the state of the hard disk drive to some receiving media (e.g., a new hard drive) based on all of the maintained data, such as maintained at a network backup location. As described above, the hard drive state may be recreated from the initial backup data (the backup state 1), along with any other incremental backup data applied in order (providing backup state 1*a*).

To restore the most recent state, step 910 represents using the backup change data of the nonvolatile storage. Note that step 910 can be performed independently, or alternatively may be merged into step 908, e.g., by transferring the nonvolatile storage contents to become the most recent incremental backup before performing step 908, and then performing step 908.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one non-transitory computer-readable medium having computer-executable instructions, which when executed perform steps, comprising:
    maintaining backup data that corresponds to preserved data for a contents of a storage device, wherein the preserved data corresponds to a first state;
    receiving a write request directed towards changing the contents of the storage device;
    filtering the write request to distinguish the write request from among other write requests that are not written as backup change data, including performance caching write data that is excluded from being written as backup change data as a result of said filtering;
    writing backup change data corresponding to the write request to a nonvolatile storage that is separate from the storage device, while allowing the write request to proceed to change the contents of the storage device to a second state; and
    restoring a receiving storage device to correspond to the storage device in the second state, including by reading the backup change data in the nonvolatile storage and reading the maintained backup data;
    wherein a performance cache is maintained on the nonvolatile storage and a change backup section of the nonvolatile storage maintains the backup change data, wherein if it is determined that the change backup section has insufficient space for the write request to be backed up as a change in the change backup section, a size of the performance cache is shrunk and a size of the change backup section is grown to accommodate the write request.

2. The at least one non-transitory computer-readable medium of claim 1 wherein maintaining the backup data comprises performing a backup operation and maintaining a data structure corresponding to the contents of the storage device following the backup operation.

3. The at least one non-transitory computer-readable medium of claim 1 wherein maintaining the backup data comprises performing a backup operation and maintaining a data structure corresponding to the contents of the storage device following the backup operation, and maintaining at least one incremental change backup data set that tracks write operations that occurred after the backup operation and before the write request.

4. The at least one non-transitory computer-readable medium of claim 1 wherein writing the backup change data comprises writing data to the nonvolatile storage along with metadata that associates the data with at least one data block of the storage device.

5. The at least one non-transitory computer-readable medium of claim 1 wherein writing the backup change data comprises, writing data to the nonvolatile storage along with metadata that associates the data to at least part of a file on the storage device.

6. The at least one non-transitory computer-readable medium of claim 1 having further computer-executable instructions comprising, writing another write request to the performance cache on the nonvolatile storage.

7. The at least one non-transitory computer-readable medium of claim 6 having further computer-executable instructions comprising, adjusting storage space in the nonvolatile storage to increase space of a section for writing the backup change data and decrease space of a section for the performance cache.

8. The at least one non-transitory computer-readable medium of claim 1 having further computer-executable instructions comprising, receiving a read request directed towards reading the contents of the storage device, and satisfying at least part of the read request from the nonvolatile storage.

9. The at least one non-transitory computer-readable medium of claim 1 having further computer-executable instructions comprising, freeing space in the nonvolatile storage by transferring at least part of the backup change data to an incremental backup data set.

10. The at least one non-transitory computer-readable medium of claim 1 wherein writing the backup change data comprises, writing information that tracks the backup change data to the storage device when the nonvolatile storage is not available, and synchronizing the nonvolatile storage when later available by processing the information.

11. The at least one non-transitory computer-readable medium of claim 1 having further computer-executable instructions comprising, providing an indication to a user indicative of a synchronization state of the nonvolatile storage, including one indication when the nonvolatile storage does not contain the backup change data needed to restore the receiving storage device to correspond to the storage device in the second state, and another indication when the nonvolatile storage does contain the backup change data needed to restore the receiving storage device to correspond to the storage device in the second state.

12. In a computing environment including a computing device, a system comprising:
    a primary nonvolatile storage, coupled to the computing device, which maintains a current state of data as changes are made from an initial state;
    a secondary nonvolatile storage, coupled to the computing device, that is separate from the primary nonvolatile storage and which maintains changes to the data from a starting point that corresponds to a preserved data state that is later than the initial state, such that a restore mechanism is configurable to recreate a restored state corresponding to the current state by combining data of the preserved data state with changes to the data maintained in the secondary nonvolatile storage; and
    a filter configured to filter the changes to select only some of the changes to be maintained by the secondary nonvolatile storage, such that the restore state includes the preserved data state as modified by a selected subset of the changes after the preserved data state, and write data that is excluded from being maintained by the secondary nonvolatile storage as a result of the filter being performance cached;

wherein a performance cache is maintained on the secondary nonvolatile storage and a change backup section of the secondary nonvolatile storage maintains the changes to the data from the starting point, wherein if it is determined that the change backup section has insufficient space for a write request to be backed up as a change in the change backup section, a size of the performance cache is shrunk and a size of the change backup section is grown to accommodate the write request.

13. The system of claim 12 wherein the primary nonvolatile storage comprises a first hard disk drive, wherein the secondary nonvolatile storage comprises flash memory, and wherein the restore mechanism recreates the restored state by writing the restored state to a second hard disk drive.

14. The system of claim 12 wherein the secondary nonvolatile storage comprises one or more items of a set, the set containing, flash memory, battery-backed up RAM, another hard disk drive, static RAM, an EEPROM device, or a network storage location, or any combination thereof; and wherein the secondary nonvolatile storage couples to the computing device via a universal serial bus device interface, as a card, as a motherboard component, by a wired connection, or by a wireless connection, or by any combination thereof.

15. In a computing environment having a computing device with data backed up to a first state, a method comprising:

maintaining, in a first nonvolatile storage, a current state of data including data at the first state as modified by changes that are made after the first state;

maintaining, in a change backup section of a second nonvolatile storage that is separate from the first nonvolatile storage, changes to the data that occur after the first state as backup changes, such that the backup changes are combinable with the data backed up to a first state to recreate a restore state corresponding to the current state;

filtering the changes to select only some of the changes as backup changes, such that the restore state includes the first state as modified by a selected subset of the changes after the first state, including performance caching the changes to the data that are excluded from being maintained as backup changes as a result of said filtering;

determining that the change backup section has insufficient space for a write request to be backed up as a change in the change backup section; and shrinking a size of a performance cache maintained in the second nonvolatile storage and growing a size of the change backup section to accommodate the write request.

16. The method of claim 15 wherein the data backed up to the first state includes a set of backup data, and at least one incremental backup data set that maintains backup change data after the first state but before the backup changes in the second nonvolatile storage.

17. The method of claim 15 wherein maintaining the backup change data comprises writing data to the second nonvolatile storage along with metadata that associates the data with at least one data block of the first nonvolatile storage, or writing data to the second nonvolatile storage along with metadata that associates the data to at least part of a file on the first nonvolatile storage.

18. The method of claim 15 further comprising, receiving a read request directed towards reading contents from the first nonvolatile storage, and satisfying at least part of the read request from the second nonvolatile storage.

19. The method of claim 15, further comprising:

determining that an amount of free space of the change backup section is below a threshold limit; and generating a warning that indicates backup space is low.

* * * * *